US007618323B2

(12) United States Patent
Rothschild et al.

(10) Patent No.: US 7,618,323 B2
(45) Date of Patent: Nov. 17, 2009

(54) GAMING MACHINE SYSTEM HAVING A GESTURE-SENSING MECHANISM

(75) Inventors: Wayne H. Rothschild, Northbrook, IL (US); Thomas M. Kopera, Villa Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 231 days.

(21) Appl. No.: 10/376,216

(22) Filed: Feb. 26, 2003

(65) Prior Publication Data

US 2004/0166937 A1 Aug. 26, 2004

(51) Int. Cl.
*A63F 13/00* (2006.01)

(52) U.S. Cl. ............................. 463/37; 463/12; 463/13; 463/20; 463/36; 715/702

(58) Field of Classification Search ................. 715/702; 463/12–13, 20, 36–37
See application file for complete search history.

(56) References Cited

U.S. PATENT DOCUMENTS

| | | | | | |
|---|---|---|---|---|---|
| 3,533,628 | A | | 10/1970 | Fisher | 273/134 |
| 4,357,488 | A | | 11/1982 | Knighton et al. | 704/246 |
| 4,521,020 | A | * | 6/1985 | Uemura et al. | 463/3 |
| 4,522,399 | A | | 6/1985 | Nishikawa | 273/143 R |
| 4,715,004 | A | | 12/1987 | Kabasawa et al. | 704/252 |
| 4,763,278 | A | | 8/1988 | Rajasekaran et al. | 704/251 |
| 4,844,475 | A | * | 7/1989 | Saffer et al. | 463/5 |
| 5,017,770 | A | * | 5/1991 | Sigalov | 250/221 |
| 5,133,017 | A | | 7/1992 | Cain et al. | 381/71 |
| 5,186,460 | A | * | 2/1993 | Fongeallaz et al. | 463/6 |
| 5,259,613 | A | | 11/1993 | Marnell, II | 273/138 |
| 5,318,298 | A | | 6/1994 | Kelly et al. | 273/122 R |
| 5,323,174 | A | * | 6/1994 | Klapman et al. | 345/156 |
| 5,370,399 | A | | 12/1994 | Liverance | 273/434 |
| 5,414,256 | A | * | 5/1995 | Gurner et al. | 250/221 |
| 5,444,786 | A | | 8/1995 | Raviv | 381/71 |
| 5,469,193 | A | * | 11/1995 | Giobbi et al. | 345/158 |
| 5,469,510 | A | | 11/1995 | Blind et al. | 381/55 |

(Continued)

FOREIGN PATENT DOCUMENTS

AU 199943487 A1 3/2000

(Continued)

OTHER PUBLICATIONS

Weinert, Joe, Entertainment Vehicles, IGWB New '97 Games, pp. 11, 12 and 15-18 (Mar. 1997).

*Primary Examiner*—Corbett Coburn
*Assistant Examiner*—William H McCulloch
(74) *Attorney, Agent, or Firm*—Nixon Peabody LLP

(57) ABSTRACT

A gaming machine has a processor for conducting a wagering game on the gaming machine and a gesture-sensing mechanism. The gesture-sensing mechanism can be used for providing various inputs. For example, the gesture-sensing mechanism provides player inputs that select certain options during operation of the game. The gesture-sensing mechanism may further distinguish between a first gesture indicative of a first player input and a second gesture indicative of a second player input. Or, the gesture-sensing mechanism provides player inputs in response to a physical action by a player that relates to a theme of the gaming machine. Alternatively or additionally, the gaming machine may include a microphone in communication with the processor. The microphone receives player inputs in the form of acoustic signals.

14 Claims, 9 Drawing Sheets

U.S. PATENT DOCUMENTS

| | | | | | |
|---|---|---|---|---|---|
| 5,524,888 | A | | 6/1996 | Heidel | 463/22 |
| 5,533,727 | A | | 7/1996 | DeMar | 463/23 |
| 5,542,669 | A | | 8/1996 | Charron et al. | 463/13 |
| 5,554,033 | A | * | 9/1996 | Bizzi et al. | 434/247 |
| 5,616,078 | A | * | 4/1997 | Oh | 463/8 |
| 5,655,961 | A | | 8/1997 | Acres et al. | 463/27 |
| 5,695,188 | A | | 12/1997 | Ishibashi | 273/143 R |
| 5,704,836 | A | * | 1/1998 | Norton et al. | 463/36 |
| 5,743,798 | A | | 4/1998 | Adams et al. | 463/17 |
| 5,762,552 | A | | 6/1998 | Vuong et al. | 463/25 |
| 5,770,533 | A | * | 6/1998 | Franchi | 463/42 |
| 5,775,993 | A | | 7/1998 | Fentz et al. | 463/17 |
| 5,803,453 | A | * | 9/1998 | Stephan et al. | 273/138.2 |
| 5,803,810 | A | * | 9/1998 | Norton et al. | 463/36 |
| 5,807,177 | A | | 9/1998 | Takemoto et al. | 463/47 |
| 5,816,918 | A | | 10/1998 | Kelly et al. | 463/16 |
| 5,828,768 | A | | 10/1998 | Eatwell et al. | 381/333 |
| 5,833,538 | A | | 11/1998 | Weiss | 463/21 |
| 5,846,086 | A | * | 12/1998 | Bizzi et al. | 434/247 |
| 5,851,148 | A | | 12/1998 | Brune et al. | 463/25 |
| 5,941,773 | A | | 8/1999 | Harlick | 463/26 |
| 5,946,658 | A | | 8/1999 | Miyazawa et al. | 704/275 |
| 5,971,850 | A | | 10/1999 | Liverance | 463/23 |
| 5,976,019 | A | * | 11/1999 | Ikeda et al. | 463/61 |
| 5,982,353 | A | * | 11/1999 | Gallery et al. | 345/156 |
| 6,030,290 | A | * | 2/2000 | Powell | 463/36 |
| 6,068,552 | A | | 5/2000 | Walker et al. | 463/21 |
| 6,089,663 | A | | 7/2000 | Hill | 297/258.1 |
| 6,110,041 | A | | 8/2000 | Walker et al. | 463/20 |
| 6,162,121 | A | | 12/2000 | Morro et al. | 463/16 |
| 6,183,365 | B1 | * | 2/2001 | Tonomura et al. | 463/36 |
| 6,210,167 | B1 | * | 4/2001 | Nishiyama | 434/247 |
| 6,217,448 | B1 | | 4/2001 | Olsen | 463/25 |
| 6,251,013 | B1 | * | 6/2001 | Bennett | 463/13 |
| 6,254,483 | B1 | | 7/2001 | Acres | 463/26 |
| 6,270,414 | B2 | * | 8/2001 | Roelofs | 463/36 |
| 6,283,860 | B1 | * | 9/2001 | Lyons et al. | 463/36 |
| 6,302,790 | B1 | | 10/2001 | Brossard | 463/20 |
| 6,308,953 | B1 | | 10/2001 | Nagano | 273/143 R |
| 6,311,976 | B1 | * | 11/2001 | Yoseloff et al. | 273/138.2 |
| 6,315,666 | B1 | | 11/2001 | Mastera et al. | 463/31 |
| 6,385,331 | B2 | * | 5/2002 | Harakawa et al. | 382/106 |
| 6,416,411 | B1 | | 7/2002 | Tsukahara | 463/35 |
| 6,422,941 | B1 | | 7/2002 | Thorner et al. | 463/30 |
| 6,471,589 | B1 | | 10/2002 | Nagano | 463/21 |
| 6,530,842 | B1 | | 3/2003 | Wells et al. | 463/46 |
| 6,561,908 | B1 | | 5/2003 | Hoke | 463/35 |
| 6,607,443 | B1 | * | 8/2003 | Miyamoto et al. | 463/40 |
| 6,620,045 | B2 | | 9/2003 | Berman et al. | 463/25 |
| 6,638,169 | B2 | | 10/2003 | Wilder et al. | 463/35 |
| 6,642,917 | B1 | * | 11/2003 | Koyama et al. | 345/156 |
| 6,676,514 | B1 | | 1/2004 | Kusuda et al. | 463/24 |
| 6,752,498 | B2 | * | 6/2004 | Covannon et al. | 351/240 |
| 6,767,282 | B2 | * | 7/2004 | Matsuyama et al. | 463/3 |
| 6,929,543 | B1 | * | 8/2005 | Ueshima et al. | 463/7 |
| 6,932,706 | B1 | * | 8/2005 | Kaminkow | 463/36 |
| 6,995,752 | B2 | * | 2/2006 | Lu | 345/174 |
| 7,001,272 | B2 | * | 2/2006 | Yamashita et al. | 463/7 |
| 7,023,427 | B2 | * | 4/2006 | Kraus et al. | 345/173 |
| 7,042,440 | B2 | * | 5/2006 | Pryor et al. | 345/158 |
| 7,053,887 | B2 | * | 5/2006 | Kraus et al. | 345/173 |
| 7,294,059 | B2 | * | 11/2007 | Silva et al. | 463/37 |
| 7,331,868 | B2 | * | 2/2008 | Beaulieu et al. | 463/30 |
| 2001/0024970 | A1 | * | 9/2001 | McKee et al. | 463/16 |
| 2001/0053712 | A1 | * | 12/2001 | Yoseloff et al. | 463/1 |
| 2002/0003919 | A1 | | 1/2002 | Morimoto | 385/18 |
| 2002/0013173 | A1 | | 1/2002 | Walker et al. | 463/40 |
| 2002/0015024 | A1 | * | 2/2002 | Westerman et al. | 345/173 |
| 2002/0037763 | A1 | | 3/2002 | Idaka | 463/16 |
| 2002/0090990 | A1 | | 7/2002 | Joshi et al. | 463/20 |
| 2002/0142825 | A1 | | 10/2002 | Lark et al. | 463/16 |
| 2002/0142846 | A1 | | 10/2002 | Paulsen | 463/43 |
| 2002/0151349 | A1 | | 10/2002 | Joshi | 463/20 |
| 2003/0054881 | A1 | | 3/2003 | Hedrick et al. | 463/29 |
| 2003/0114214 | A1 | | 6/2003 | Barahona et al. | 463/20 |
| 2003/0197689 | A1 | * | 10/2003 | May | 345/173 |
| 2004/0029637 | A1 | | 2/2004 | Hein, Jr. et al. | 463/35 |
| 2008/0132333 | A1 | * | 6/2008 | Kogo | 463/37 |
| 2008/0234044 | A1 | * | 9/2008 | Aida | 463/37 |

FOREIGN PATENT DOCUMENTS

| | | |
|---|---|---|
| JP | 5-31254 | 2/1993 |
| JP | 10-277213 | 10/1998 |
| JP | WO 01/05477 A3 | 1/2001 |
| WO | WO 01/05477 A2 | 1/2001 |
| WO | WO 01/33905 A2 | 5/2001 |
| WO | WO 01/33905 A3 | 5/2001 |
| WO | WO 02/24288 A2 | 3/2002 |
| WO | WO 02/24288 A3 | 3/2002 |
| WO | WO 02/40921 A2 | 5/2002 |
| WO | WO 02/40921 A3 | 5/2002 |

* cited by examiner

Fig. 3
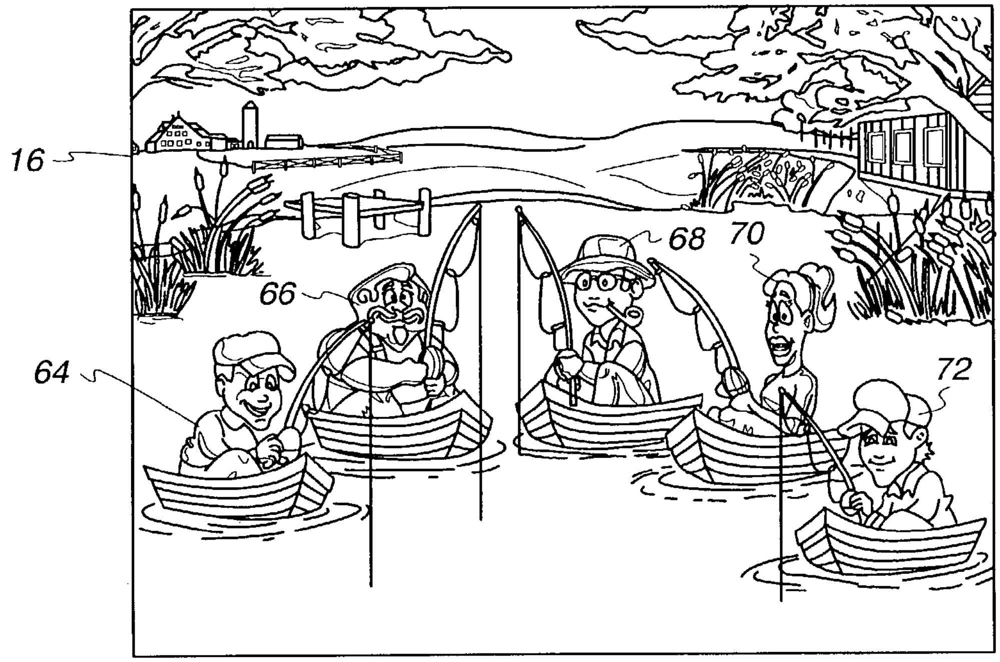
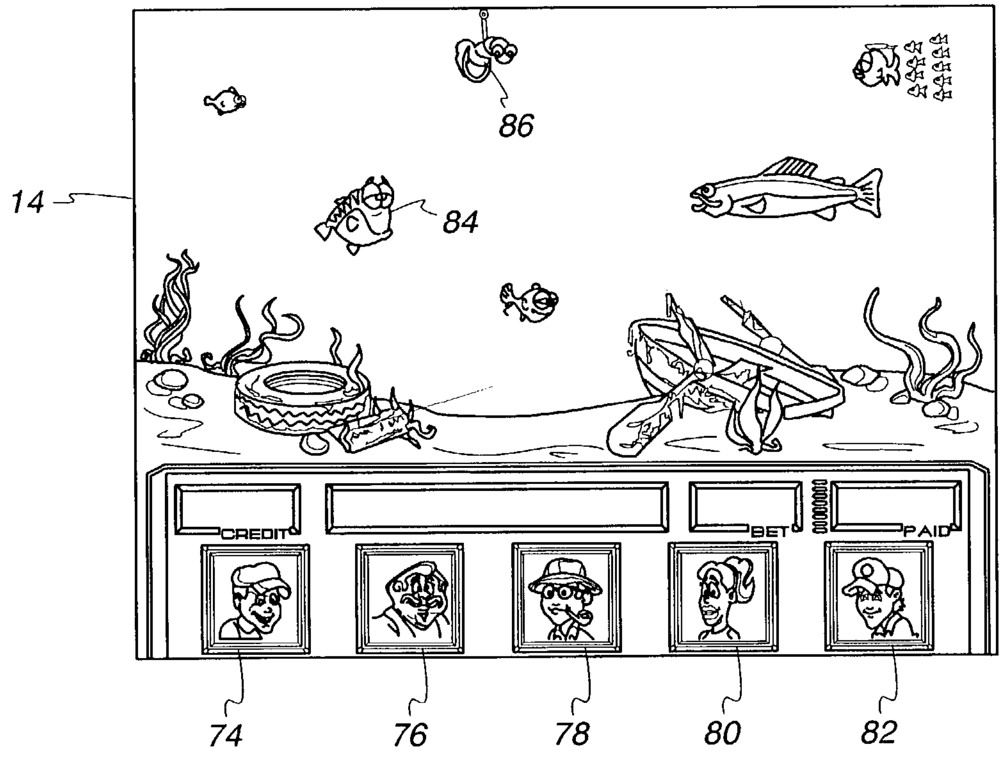
Fig. 4

GAMING MACHINE SYSTEM HAVING A GESTURE-SENSING MECHANISM

RELATED APPLICATIONS

This application is related to U.S. patent application Ser. No. 10/375,827 entitled "Gaming Machine System Having An Acoustic-Sensing Mechanism," being concurrently filed with this application, assigned to the assignee of the present application, and incorporated herein by reference in its entirety.

FIELD OF THE INVENTION

The present invention relates generally to gaming machines and, more particularly, to a gaming machine having the ability to sense gestures and other movement from a player and to detect acoustic signals from a player.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, operators strive to employ the most entertaining and exciting machines available because such machines attract frequent play and, hence, increase profitability to the operator.

One way to enhance player excitement is to provide more interactivity between the game and the player. Thus far, player inputs have been primarily limited to mechanical and electro-mechanical controls and switches. In one prior art system, a motion sensor was used to only initiate the game, as other mechanical and/or electro-mechanical controls and switches were used as inputs during the game.

As such, a need exists for gaming machines with new types of interactivity to increase the game's excitement for players.

SUMMARY OF THE INVENTION

The present invention relates to a gaming machine comprising a processor for conducting a wagering game on the gaming machine and a gesture-sensing mechanism. The gesture-sensing mechanism can be used to provide various inputs during the operation of the game. For example, the gesture-sensing mechanism provides player inputs that are used by the processor for selecting an outcome of the wagering game. The gesture-sensing mechanism may further distinguish between a first gesture indicative of a first player input and a second gesture indicative of a second player input. In another embodiment, the gesture-sensing mechanism provides player inputs in response to a physical action by a player that relates to a theme of the gaming machine.

In an alternative embodiment, the gaming machine includes a processor for conducting a wagering game on the gaming machine and at least one microphone. The microphone receives player inputs in the form of acoustic signals that are used during the operation of the game.

In addition to increased interactivity, the novel gesture-sensing mechanism and/or the acoustic-sensing mechanism also provides the player with a feeling of having some control over the outcome of the game. The additional interactivity and the player's feeling of "control" over the game yields a gaming machine that has enhanced entertainment value. Ultimately, this results in a more successful gaming operation for the owner of the gaming machine.

The above summary of the present invention is not intended to represent each embodiment or every aspect of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

FIG. 3 is a display screen of the upper display of the gaming machine in FIG. 1.

FIG. 4 is a display screen of the lower display of the gaming machine in FIG. 1.

Figure 1:
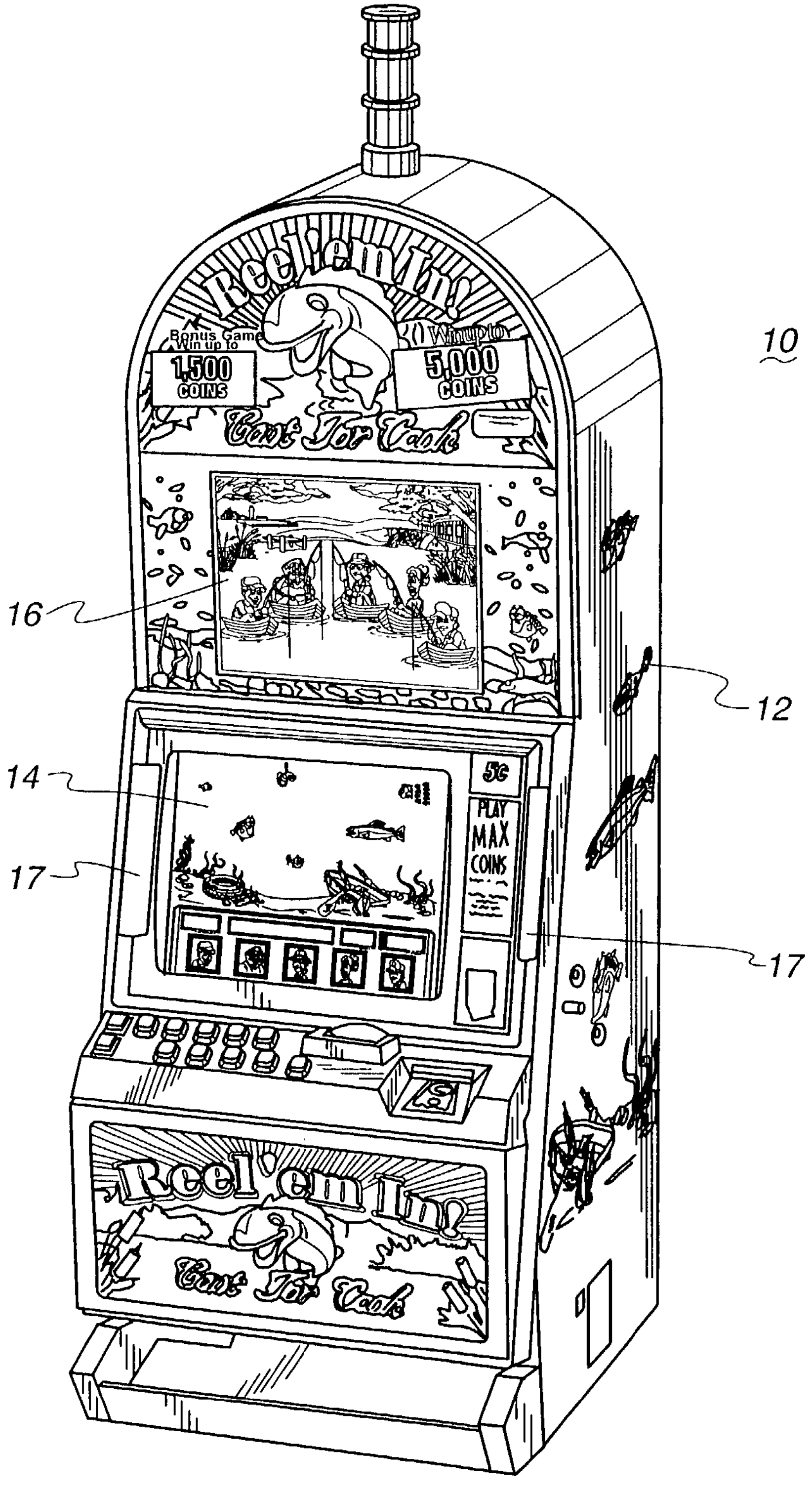
FIG. 1 is a simplified front view of a slot machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, there is depicted a video gaming machine 10 that may be used with the gesture-sensing mechanism and/or the audible-sensing mechanism according to the present invention. The gaming machine 10 includes a large bonnet-top cabinet 12 containing two video displays 14 and 16. The video displays 14 and 16 may comprise a dot matrix, CRT, LED, LCD, electro-luminescent display or generally any type of video display known in the art. In the illustrated embodiment, the gaming machine 10 is an "upright" version in which the video displays 14 and 16 are oriented vertically relative to the player. The video displays are parallel to each other with their left and right edges aligned. The video displays are positioned adjacent to each other and separated by a relatively small distance. It will be appreciated, however, that any of several other models of gaming machines are within the scope of the present invention including, for example, side-by-side video displays being parallel with their top and bottom edges aligned. Additionally, more than two video displays may be used, and the video displays may be separated by varying distances. Furthermore, a "slant-top" version containing two video displays that are slanted at about a thirty degree angle toward the player may be used.

In one embodiment, the gaming machine 10 is operable to play a game entitled REEL EM IN—CAST FOR CASH™ having a fishing theme. The REEL EM IN—CAST FOR CASH™ game features a basic game in the form of a slot machine with five simulated spinning reels, as is known in the art, and a bonus game that provides unified fishing images on the two displays. The term "unified image" refers to a single image that is divided into portions that are shown on separate displays. For example, if the unified image is a person, one half of the person may be shown on a first display and the other half of the person may be shown on a second display. Typically, the first and second displays are positioned adjacent to each other to allow an observer to easily visually join the two halves of the image. Although, the following description describes the REEL EM IN—CAST FOR CASH™ game on the gaming machine 10, it will be appreciated that the gaming machine 10 may be implemented with different games and/or with any of several alternative game themes.

FIG. 1 also shows a pair of motion sensors 17 that are used as input devices for the gaming machine 10. Thus, in addition to the typical mechanical or electro-mechanical switches in the gaming machine 10, the player also provides inputs to the gaming machine through these motion sensors 17. Various inputs for the motion sensor 17, which is a part of a gesture-sensing mechanism, will be described below in more detail with respect to FIGS. 5-10.

Figure 2A:
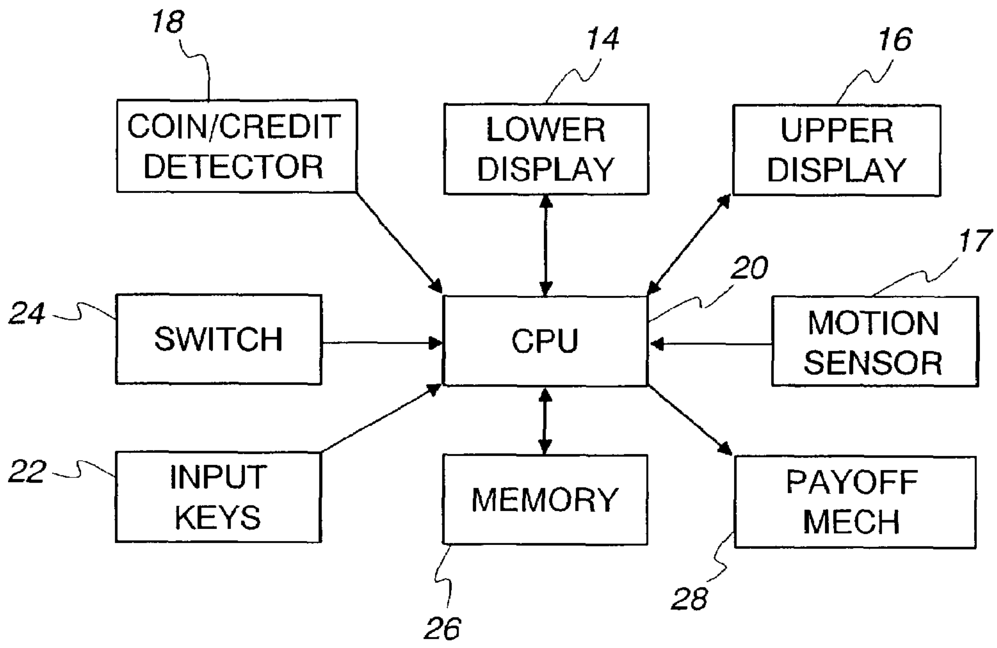
FIG. 2A is a block diagram of a control system suitable for operating the gaming machine in FIG. 1.

FIG. 2A is a block diagram of a control system suitable for operating the gaming machine 10. The motion sensor 17, which is part of the gesture-sensing mechanism that is used for detecting the gestures of the player, is coupled to the main CPU 20. The gesture-sensing mechanism further includes a memory device (which can be a portion of the system memory 26) that stores the gaming machine inputs associated with the corresponding gestures that the player makes. The gesture-sensing mechanisms are described in detail below with respect to FIGS. 5-10.

Figure 2B:
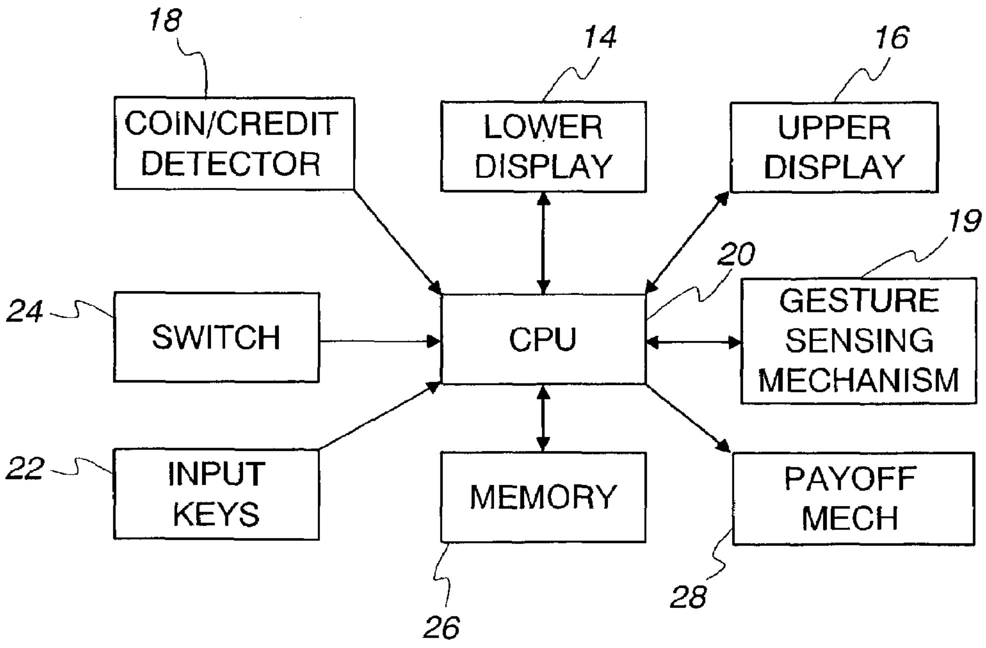
FIG. 2B illustrates a block diagram of an alternative control architecture.

FIG. 2A has been described with reference to using the CPU 20 for processing the information from the motion sensors 17 and, thus, the CPU 20 (and perhaps the system memory 26) is part of the gesture-sensing mechanism. In an alternative system architecture illustrated in FIG. 2B, the gesture-sensing mechanism 19 is its own peripheral device that is coupled to the CPU 20, and simply transmits the player input signal to the CPU 20. Thus, the gesture-sensing mechanism 19 includes its own processor and memory device that is used to determine the input signal associated with the gesture made by the player.

A coin/credit detector 18 signals the CPU 20 when a player has inserted a number of coins or played a number of credits. Then, the CPU 20 operates to execute a game program which causes the lower video display 14 to display the basic game that includes simulated reels with symbols displayed thereon. The player may select the number of paylines to play of the video slot machine and the amount to wager via input keys 22 or through the gesture-sensing mechanism or audible-sensing mechanism described below. The basic game commences in response to the player activating a switch 24 (e.g., by pulling a lever or pushing a button), causing the CPU 20 to set the reels in motion, randomly select a game outcome, and then stop the reels to display symbols corresponding to the pre-selected game outcome.

In one embodiment, certain basic game outcomes cause the CPU 20 to enter a bonus mode, causing the video displays 14 and 16 to show a bonus game. The display screens associated with the REEL EM IN—CAST FOR CASH™ bonus game are generally described in detail in relation to FIGS. 3 and 4.

The system memory 26 stores control software, operational instructions and data associated with the gaming machine 10. In one embodiment, the memory 26 comprises a separate read-only memory (ROM) and battery-backed random-access memory (RAM). It will be appreciated, however, that the system memory 26 may be implemented on any of several alternative types of memory structures or may be implemented on a single memory structure. A payoff mechanism 28 is operable in response to instructions from the CPU 20 to award a payoff of coins or credits to the player in response to certain winning outcomes which may occur in the basic game or bonus game. The payoff amounts corresponding to certain combinations of symbols in the basic game is predetermined according to a pay table stored in system memory 26. The payoff amounts corresponding to certain outcomes of the bonus game are also stored in system memory 26. Furthermore, the system memory 26 stores data relating to the unified fishing images to be shown on the lower and upper displays 14 and 16.

The REEL EM IN—CAST FOR CASH™ basic game is implemented on the lower display 14 on a plurality of five video simulated spinning reels (hereinafter "reels"), possibly with several paylines. After deciding on a wager input, the player activates a lever or push button to set the reels in motion. The CPU 20 uses a random number generator to select a game outcome (e.g., "basic" game outcome) corresponding to a particular set of reel "stop positions." The CPU 20 then causes each of the video reels to stop at the appropriate stop position. Video symbols are displayed on the reels to graphically illustrate the reel stop positions and indicate whether the stop positions of the reels represent a winning game outcome. Winning basic game outcomes (e.g., symbol combinations resulting in payment of coins or credits) are identifiable to the player by a pay table.

Included among the plurality of basic game outcomes are a plurality of different start-bonus outcomes for starting play of a bonus game. A start-bonus outcome may be defined in any number of ways. For example, a start-bonus outcome occurs when a special start-bonus symbol or a special combination of symbols appears on one or more of the reels in any predetermined display position. The appearance of a start-bonus outcome causes the processor to shift operation from a basic-game mode to a bonus-game mode.

In response to starting the REEL EM IN—CAST FOR CASH™ bonus game, the lower and upper displays 14 and 16 work together to present unified fishing images for the bonus game. The upper video display 16 shows the bonus screen image illustrated in FIG. 3 comprising a group of fishermen on a lake, and the lower video display 14 shows the bonus screen image illustrated in FIG. 4 comprising an underwater view of the lake. Thus, the unified fishing image provides an above-water and below-water view of fishing. Normally, the upper video display 16 shows the activities of fishermen above the water, and the lower video display 14 shows the activities of fish below the water. FIG. 1 shows how the two portions of the fishing image on the upper and lower displays 16 and 14, namely, above and below the waterline, interact with each other and form the unified fishing image when viewed by the player.

The REEL EM IN—CAST FOR CASH™ bonus game commences with the bonus screen of FIG. 3 on the upper video display 16 and the bonus screen of FIG. 4 on the lower video display 14. The initial upper bonus screen of FIG. 3 shows five fishermen characters 64, 66, 68, 70, 72 each within his or her own boat on a lake. The CPU 20 randomly selects the fisherman characters to display from a cast of possible characters stored in the memory 26. The player starts the bonus game by selecting one of the illustrated fishermen 64, 66, 68, 70, 72. In the illustrated embodiment, the player touches a mechanical button or fisherman icon 74, 76, 78, 80, 82 corresponding to the fishermen 64, 66, 68, 70, 72, respectively, to begin the fishing bonus. For the illustrated example, the player selects the button 76 corresponding to the portly fisherman character 66.

Once the player has selected the fisherman 66, the CPU 20 presents the unified fishing images on the lower and upper displays 14 and 16. The lower and upper displays 14 and 16 work together to provide the unified images of the fishing scene such that an action on the upper display 16 is linked with an action on the lower display 14. As illustrated in FIG. 3, the upper display 16 shows the fishermen 64, 66, 68, 70, 72 in boats with their fishing lines extending into the water. As depicted in FIG. 4, the lower display 14 shows various fish 84 swimming in and out of the underwater scene. During the fishing presentation, bait 86, such as the displayed hook with a worm, or in other embodiments a lure, is lowered down beneath the selected fisherman 66 in the upper display 16.

For the fishing action, some of the displayed fish immediately dart for the bait 86 and other fish swim onto the display 14. Bubbles (not shown) appear around the bait 86 to hide the fish near the bait 86. The CPU 20 uses a random number generator (not shown) to select a bonus game outcome, namely, the fish that the selected fisherman 66 will reel out of the water. On the lower display 14, a flurry of bubbles appears below water while the fisherman 66 reels in the fish 84. While the fisherman 66 reels in the fish, the upper display 16 shows a splash that increases in size according to the size of the fish 84 on the line. The flurry of bubbles on the lower display 14 and the splash on the upper display 16 is one example of the linked action on the displays 14 and 16. When the fish 84 is reeled from the water, the fisherman characters 64, 68, 70, 72 look toward the fisherman 66 reeling in the fish and comment about the presence of the fish. Eventually, the fish is displayed to the player, and a credit or award corresponding to the fish is provided to the player.

Figure 5:
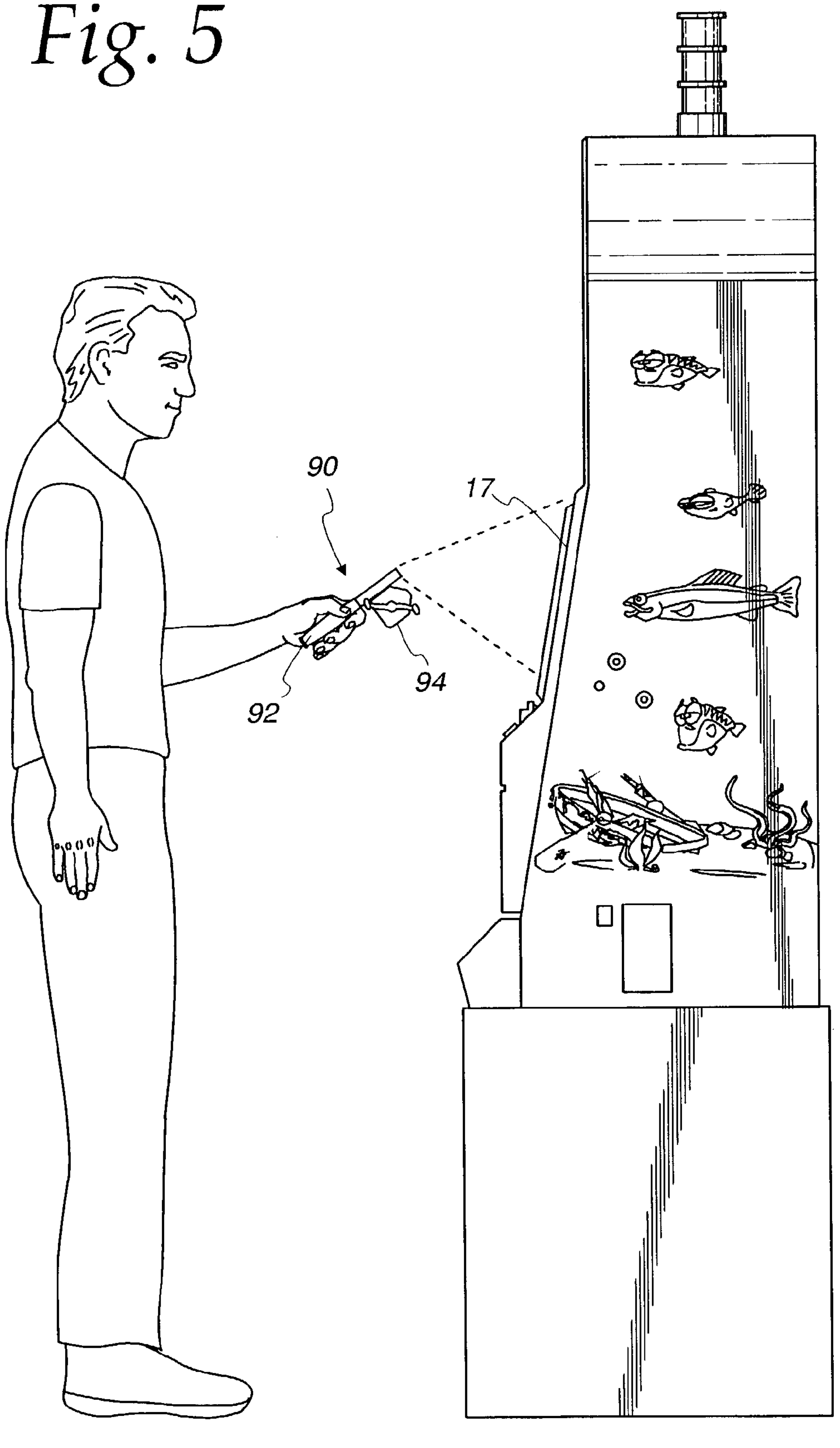
FIG. 5 illustrates a player using an instrument simulating a fishing rod in the gaming machine of FIG. 1.

FIG. 5 illustrates a player at the gaming machine 10 of FIG. 1. The player is holding an instrument 90 which moves under the power of the player. The movements of the instrument 90 are sensed by the motion sensors 17 on the cabinet of the gaming machine 10. In this embodiment, the fishing theme of the gaming machine 10 is also present in the instrument 90, which simulates the hand-held portion 92 of a fishing rod and a reel 94 of the fishing rod.

In one embodiment, the instrument 90 is similar to a DigiPen, which transmits a signal that is received by the motion sensors 17 to detect the location of the instrument 90. Such an instrument 90 includes a transmitter that transmits a certain signal and a fixed receiver or receivers (i.e., motion sensors 17) coupled to a processor that determines the position of the instrument relative to the fixed receiver(s). Further details of such an instrument 90 are disclosed in U.S. Pat. No. 5,469,193, which is hereby incorporated by reference in its entirety.

The physical actions of the player that simulate reeling of the fish are detected by the motion sensors 17. The movement of the hand-held portion 92 in the upward direction simulates setting a hook in the mouth of a fish. Further, the reeling of the reel 94 simulates retrieving the fishing line, with or without a fish. The player may also provide the physical actions which simulate casting the line into the water. The hand-held portion 92 can include one signal transmitter for producing a first type of signal, while the reel 94 can include a second signal transmitter for producing a second type of signal. Thus, the instrument 90 may have multiple signal transmitters for providing multiple player inputs.

Alternatively, only one transmitter can be present in the instrument 90 for detecting the unique physical actions associated with (i) setting the hook, (ii) reeling the reel, and (iii) casting. The transmitted signals are then detected by the sensors 17. For example, the physical action for setting the hook is an upward movement. The physical action for reeling the reel is a slight up and down oscillating movement. And, the physical action for casting is a downward or a side-to-side movement. Once one of these types of physical actions occur, the gaming machine 10 compares the resultant signal with signal data stored in the memory so as to determine the input desired by the player.

In the embodiment of FIG. 5, the gesture-sensing mechanism is used in the bonus-game mode to allow the player to set the hook on the fish and to reel in the fish. Specifically, after selecting one of the fishermen 74, 76, 78, 80, 82 in FIG. 4, the player performs the actions for the selected fisherman. The player uses the instrument 90 to set the hook on one of the fish by raising the hand-held portion 92. Additionally, the player then reels in the fish by use of the fishing reel 94 on the instrument 90. Simulation of the physical actions associated with setting the hook and reeling the fish are sensed by the motion sensors 17. The gaming machine 10 then compares the signals associated with each gesture with known data signals to determine the player's desired input. The gaming machine 10 then performs a certain function associated with that input.

In FIG. 5, the player is using the instrument 90 to set the hook on a fish and to reel in a fish. Thus, the gaming machine 10 performs a function in response to the gesture(s) from the player (i.e., selecting a fish) that is related to the outcome of the game, although the outcome is still random. Additionally, the instrument 90 can be used for other functions, such as selecting a wager amount, whereby each gesture in a sequence increases the wager amount by a known increment (e.g., $1), or selecting paylines in a slot machine. Furthermore, the instrument 90 can be used for functions that are unrelated to the outcome of the gaming machine, such as the use of the instrument 90 in a set-up mode for selecting the light setting, the theme, or a volume setting for the gaming machine 10.

In a further embodiment, the instrument 90 includes all the components necessary to sense a gesture by the player, and also to determine the player input associated with that gesture. The instrument 90 then transmits the signal that is received by sensors in the gaming machine to instruct the gaming machine 10 of the player's desired input. In this embodiment, the gesture-sensing mechanism does not require motion sensors 17 of the gaming machine 10. Rather, the gaming machine 10 simply has a receiver for receiving the transmitted signal from the instrument 90. In this embodiment, the instrument 90 may be physically connected to the gaming machine 10 via an electrical wire or wires that transmit the signal. The wire also serves the purpose of ensuring that the player does not move the instrument 90 from the vicinity of the gaming machine 10 or steal the instrument 90.

The previous embodiments have taught the use of the instrument 90 in a manner whereby the instrument 90 is not physically connected to the gaming machine 10. It should be understood, however, that the use of a wire for transmitting the signal from the instrument 90, or simply a mechanical wire for maintaining the instrument 90 in physical connection with the gaming machine 10, is contemplated with the scope of the present invention.

The gaming machine 10 may also provide audible instructions from speakers located on the gaming machine 10. These instructions can be random or in response to certain inputs or activities from the player. For example, in response to the player spinning the reel 94 too slowly, the CPU 20 of the gaming machine 10 can cause the speakers on the machine 10 to state "Speed up your reeling because it looks like you've hooked a nice one!"

Figure 6:
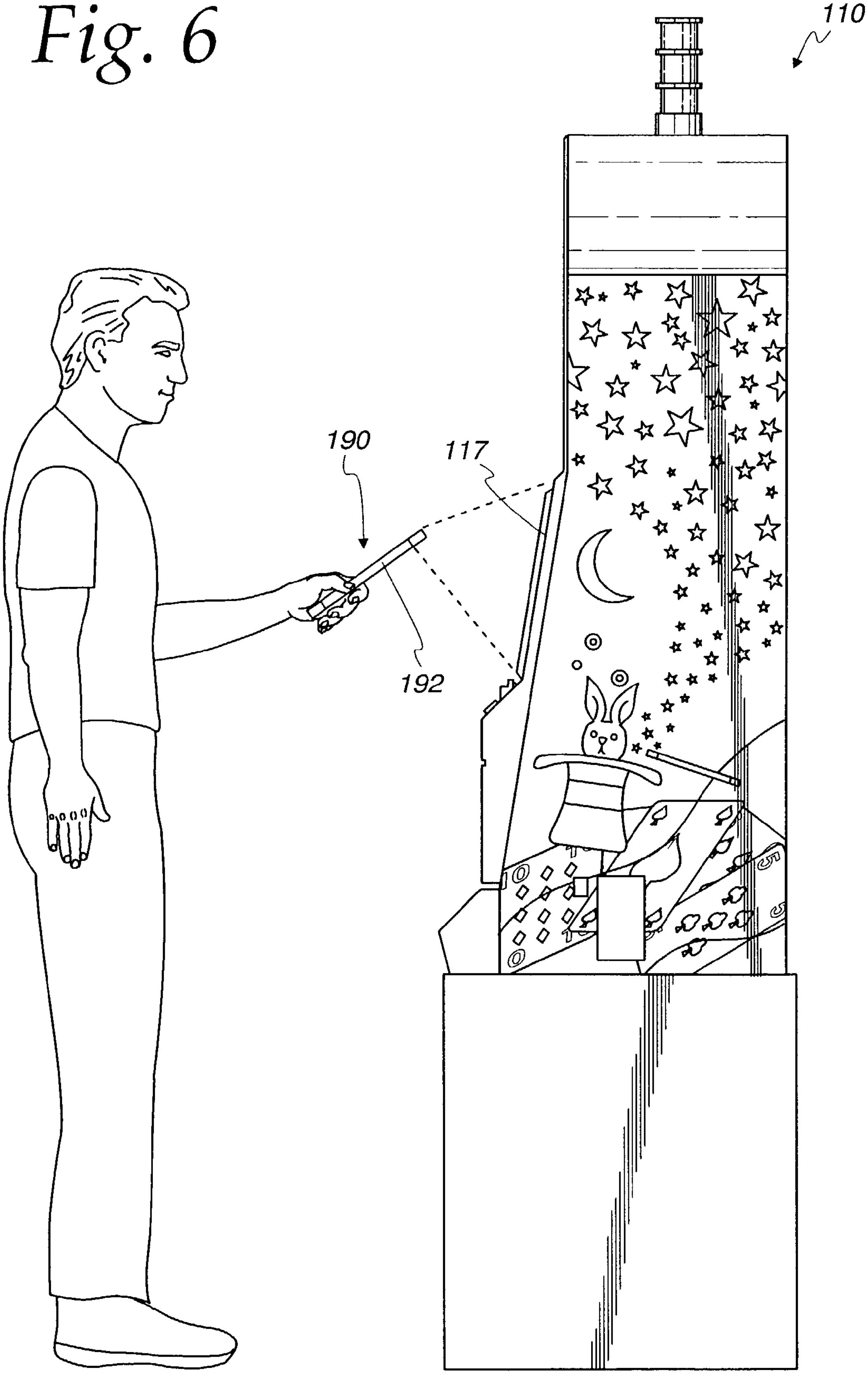
FIG. 6 illustrates a player using an instrument simulating a magic wand in an alternative gaming machine.

FIG. 6 illustrates an alternative embodiment whereby a gaming machine 110 includes a magic theme. The gaming machine 110 includes at least one motion sensor 117. The player holds an instrument 190, the motions of which are sensed by the motion sensor 117. In this embodiment, the instrument 190 is a "magical" wand 192 that the player can use to change a game character or prize displayed on the gaming machine 110 into a new or different prize. The "magical" wand 192 can be used in a bonus-game mode or in a basic-game mode. For example, the "magical" wand 192 can be used for selecting wager amounts in the basic game, where each flick of the wand increments the wager by a certain known value (e.g., $1) until the desired wager is set. Or, the "magical" wand 192 can be used for selecting certain paylines if the basic game is of the slot machine genre.

The gaming machine 110 may also provide random or activity-responsive audible instructions from speakers located on the gaming machine 110. As an example of an activity-responsive audible instruction, in response to the player waving the "magical" wand 192 too vigorously, the CPU of the gaming machine 110 can cause the speakers on the machine 110 to state "You need to slow down the movements of the wand; you are performing magic, not directing the symphony!"

Figure 7:
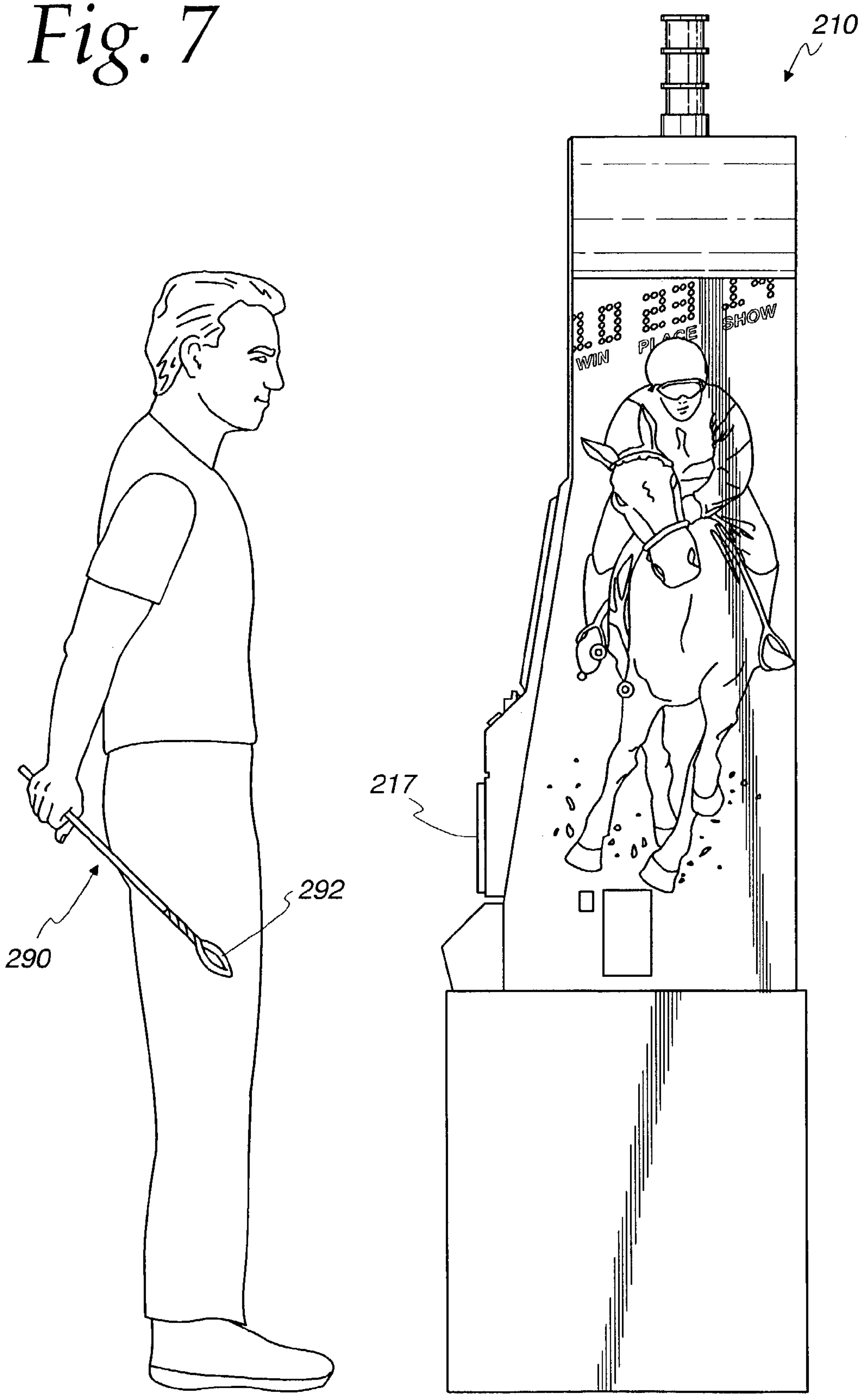
FIG. 7 illustrates a player using an instrument simulating a horse-racing whip in yet another alternative gaming machine.

FIG. 7 illustrates a horse-racing theme for a gaming machine 210. The gaming machine 210 has at least one motion sensor 217 for sensing the movements of an instrument 290, which simulates a whip 292. The player "whips" a simulated horse, perhaps in a bonus game where the player selects a horse in a race that will determine the amount of his bonus. Because the physical movement associated with this whipping gesture is lower on the player's body, the motion sensor 217 is located lower on the cabinet of the gaming machine 210 compared with the previous embodiments. As stated above, the instrument 290 could be used for making selections during the basic-game mode, as well.

Like the previous embodiments, the gaming machine 210 may also provide random or activity-responsive audible instructions from speakers located on the gaming machine. As an example of an activity-responsive audible instruction, in response to the player "whipping" too often, the CPU of the gaming machine 110 can cause the speakers on the machine to state "Hey, that's starting to hurt a bit" in a horse-like voice. As an example of a random audible instruction, the speakers may provide statements announcing the race in which the player is "participating" using typical horse-racing jargon.

FIGS. 5-7 illustrate instruments 90, 190, 290 that sense gestures from players. The present invention also contemplates having a force-feedback mechanisms in these instruments 90, 190, 290 to provide a more realistic experience. For example, the fishing reel 94 can have gears that make the player feel as though a fish is pulling line out of the reel 94. Or, the hand-held portion 92 can move and/or randomly vibrate as if a fish is hooked on the line. If the instrument simulates a gun in a gaming machine, the instrument may have a recoil force. The instrument can also simulate a dollar-wheel puller, providing a force feedback to the player as well.

Figure 8:
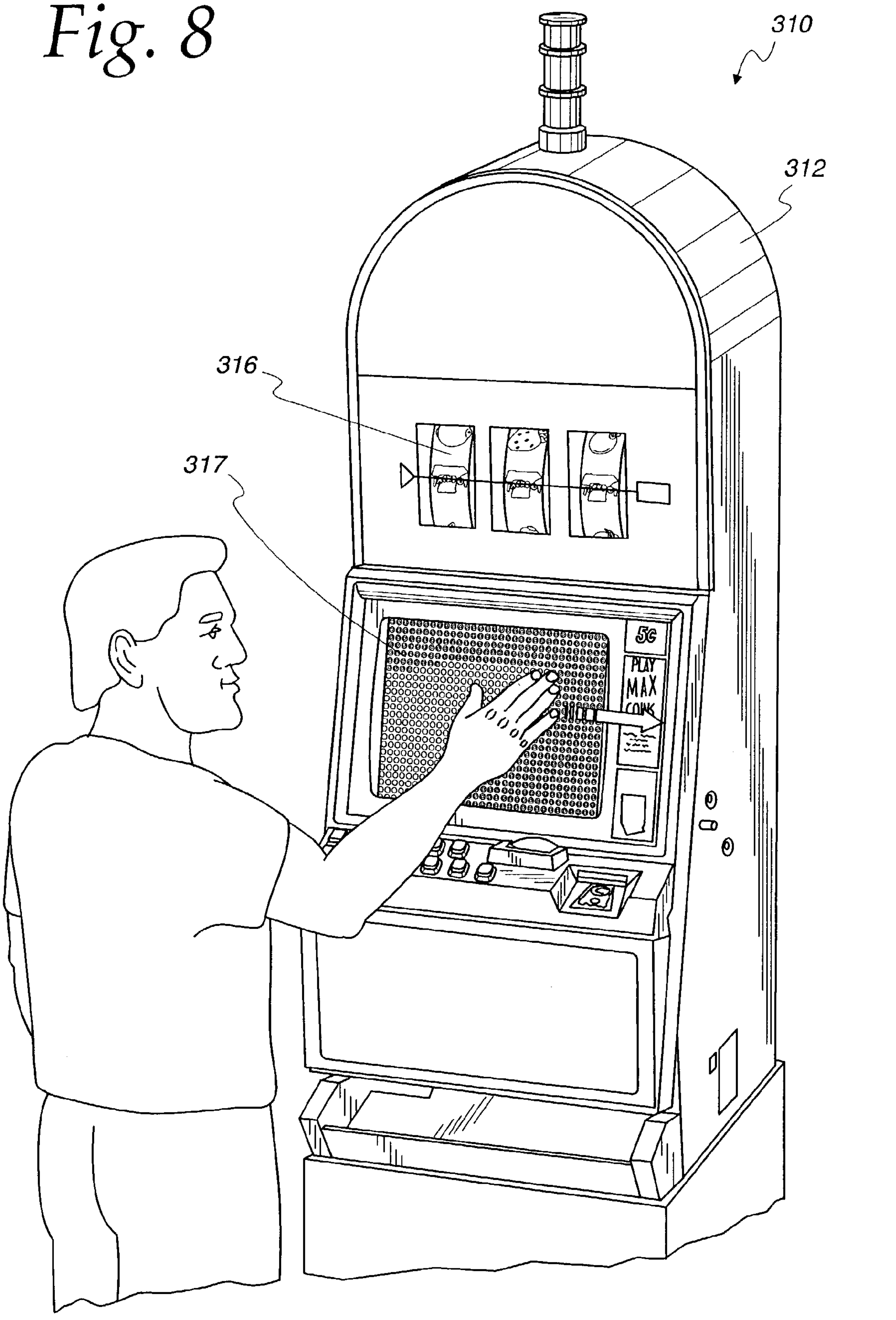
FIG. 8 illustrates a gaming machine having another gesture-sensing mechanism that uses hand contact for sensing.
Figure 9:
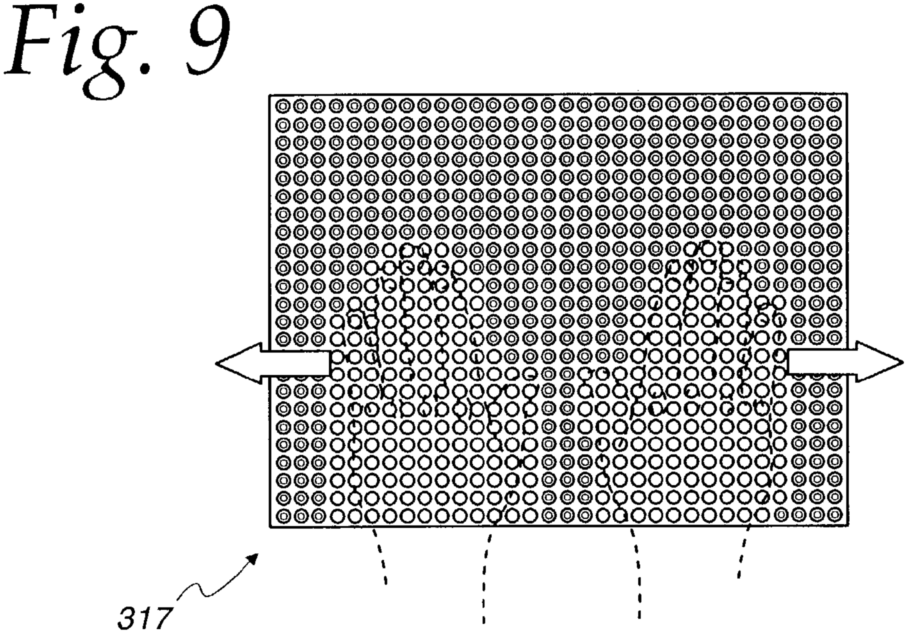
FIG. 9 illustrates motions being sensed by the gesture-sensing mechanism of FIG. 8.

FIGS. 8-9 illustrate an alternative gesture-sensing mechanism, one which relies on the actual contact by the player. Here, the gaming machine 310 includes a main cabinet 312 having a plurality of reels 316, as is typical in a slot machine. In addition to some mechanical or electro-mechanical switches, the gaming machine 310 includes a touch panel 317 having a plurality of discrete lights. Upon contact, the lights in the panel 317 are activated and stay lit for a certain amount of time after contact. Thus, as shown in FIG. 8, as the player moves his hand from left to right, the lights on the panel 317 stay lit behind his hand, forming a light stream. The sequential activation of the lights due to the player's gesture provides a signal that is monitored by a processor, possibly a processor dedicated only to the gesture-sensing mechanism or the main CPU for the machine 310, to determine the desired player input.

While FIG. 8 illustrates a first gesture using one hand, FIG. 9 illustrates a second gesture that requires the use of two hands. The hand gestures associated with FIGS. 8-9 may be particularly suited for a card game, whereby certain hand gestures dictate a player's input regarding a request to take or decline another card in a poker game.

It should be noted that the stream of lights on the panel 317 provides some feedback to the player as to what gesture has been received. In other words, the player sees what gesture he has performed by observing the stream of lights after the gesture. The gaming machine 310 may also include a further feedback, as well. If, for example, the physical action of the player's hands in FIG. 9 corresponds to a gesture meaning that the player declines to take another card in a card game, then the gaming machine can have a video screen indicating "confirm that you are declining a card," at which time the player hits a mechanical switch to confirm his intention. Or, as will be described below in FIG. 11, the gaming machine 310 may include a microphone that allows the player to audibly confirm his intention to decline a card.

Figure 10:
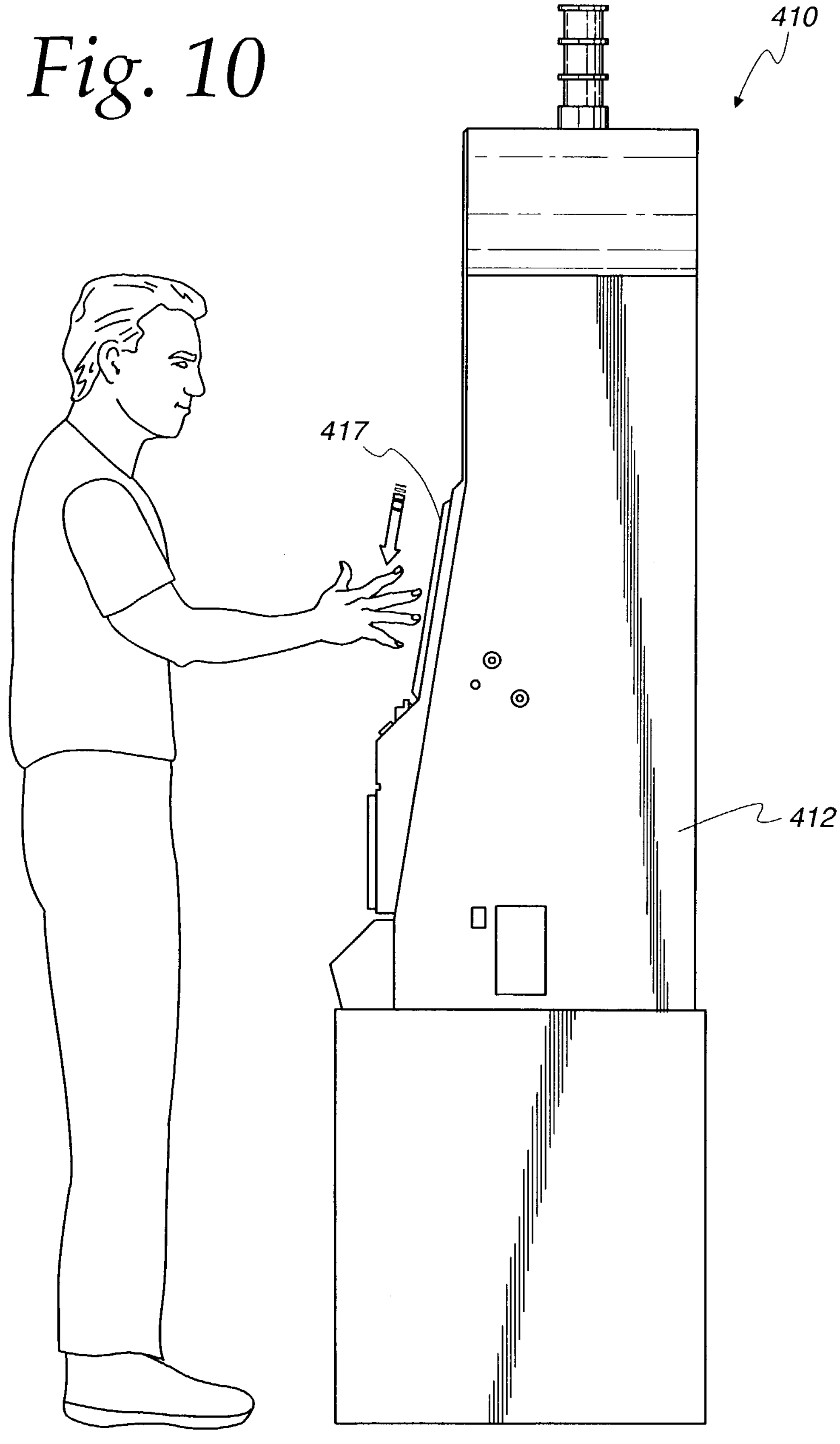
FIG. 10 illustrates a gaming machine having another gesture-sensing mechanism that does not require contact for sensing.

FIG. 10 illustrates yet another type of gesture-sensing mechanism. Here, the gaming machine 410 includes a sensor 417 that does not require the contact of the player as discussed with respect to FIGS. 8-9, or the use of an instrument as discussed with respect to FIGS. 5-7. The sensor 417 may be a video camera that captures the sequential physical movements of a player's hand at a known region in front of the gaming machine 410. The sequential physical movements are then compared with a database of known movements to determine which gesture has been performed by the player. The gaming machine 410 then performs the function associated with that gesture.

Alternatively, the gaming machine 410 may emit infrared (IR) energy in the region where the player's hand is located and the sensor 417 reads the IR energy reflected from the hand. The IR energy that is directed beyond the hands is dissipated quickly so other reflections of the IR energy are minimal compared with the reflection from the hand movement. The reflected light allows the processor to build a 3-D image of the physical movement of the hand which corresponds to the gesture. Such a motion processor is available from Toshiba.

Figure 11:
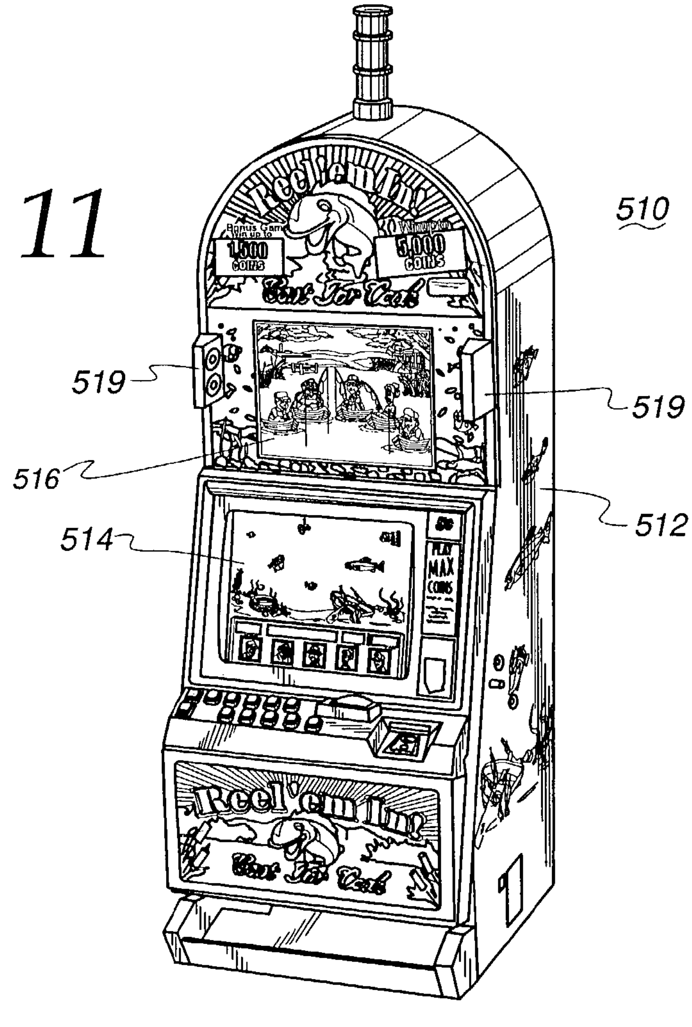
FIG. 11 illustrates a gaming machine with a microphone for receiving acoustic signals.

FIG. 11 illustrates an alternative embodiment of a gaming machine 510 that relies on sound, voice or speech recognition for the player's inputs. This audible recognition can be in the simple form of capturing any type of audible signal from a player without attempting to discern what was stated. Or, this audible recognition can be in a more sophisticated form that has the ability to receive and interpret certain words, or to receive and understand certain phrases or sentences.

To receive the acoustic (i.e., audible) signals from the player, the gaming machine 510 includes a pair of microphones 519 on the game cabinet 512 near one of the video displays 514 and 516. The microphones 519 are inwardly directed to focus on a region where the player's audible signal will begin propagation from the player's mouth. Arrangement of the microphones 519 in this fashion tends to limit the effect of the ambient noise. The microphones 519 convert the acoustic signals to input audio signals corresponding to the acoustic signals. The microphones 519 may include internal amplifiers for amplifying the input audio signals before transmitting the signals to other components for processing.

The microphones 519 are coupled to the main CPU of the gaming machine 510 where the input audio signals are processed. Or, in a manner similar to FIG. 2B, the voice/speech sensing mechanism can be its own peripheral device with a processor and a memory device for determining the desired player input, and sending a signal to the main CPU corresponding to that desired player input. The player inputs can be of the various types discussed with respect to the gesture-sensing mechanism, including the selection of a wager amount, the selection of a payline in a slot game, the accepting or declining of a card in a card game, or the selection of certain player options in a bonus game.

In use, the microphone 519 transduces mechanical energy in the form of pressures from sound waves (i.e., acoustic signals) to electrical energy in the form of audio signals. To recognize words or phrases, the analog audio signals must be converted into digital signals and, thus, an A/D converter is needed. A processor then compares the digital audio signal against a digital database (i.e., an electronic vocabulary) of phrases, words and/or syllables, which may contain voice patterns for that particular player that have been previously stored. Preferably, the processor filters the ambient noise so as to reduce or eliminate the interference received from the ambient environment. For any given gaming machine 510, only a limited number of the words, syllables, or phrases is needed (e.g., 30 or so) since only a limited amount of player inputs are available. Each word, syllable, or phrase, however, may be stored in various forms corresponding to different dialects since gaming machines attract players from various geographical regions. The voice/speech sensing mechanism can be used to receive audible instructions from the player in a game set-up mode, in a basic-game mode, or in a bonus-game mode.

Furthermore, the voice/speech sensing mechanism can be used in conjunction with any of the previously mentioned gesture-sensing mechanisms from FIGS. 1-10. In other words, the player inputs can be in the form of gestures and audible instructions, causing the gaming machine to perform various functions corresponding to those gestures and audible instructions.

Additionally, the microphones 519 of FIG. 11 present the opportunity for enhanced entertainment by providing real-time monitoring of the player's activities and mood. For example, if the player states some sort of common curse word, the CPU of the gaming machine 510, upon receiving the acoustic signal corresponding to the curse word, can direct an audible response back to the player via speakers, such as "You really shouldn't use that kind of language in public. If you used nicer language, maybe you would win more often." Or, if the player yells out "I think I have a big fish" when playing the bonus game on the gaming machine 510, the hooked fish that is displayed on display 514 can stop swimming, turn towards the player, and say "Of course I'm a BIG FISH, but you don't have me in the boat yet." At that point, the fish can dive deeper toward the bottom while remaining hooked. In these latter examples, the CPU of the gaming machine 519 is comparing the input audible words to a few key words that are expected from a player, like "Big Fish."

For enhanced entertainment, when using microphones with the gaming machine 10 of FIGS. 1-5 having the gesture-sensing mechanism, the audible sensing mechanism could expect to hear certain statements when a player hooks a fish while using the instrument 90 that simulates the hand-portion 92 of a fishing rod and the reel 94. If the player states, "I've got one!," which is received by the microphones, the main CPU can instruct the speakers on the gaming machine to state "You ain't got anything yet pal!" For the embodiment of FIG. 6, if the player says "Wow!" or "Yeah!" after changing a character or a prize to a better prize, the main CPU, in response to this audible signal, can instruct the speakers on the gaming machine to state "Dude, if you keep performing magic like that, you're going to have your own show in Vegas!" For the embodiment of FIG. 7, if the player says "Come on Baby!" or "GIDDAP!!" after "whipping" the horse with the instrument 290, the main CPU, in response to this audible signal, can instruct the speakers on the gaming machine to state "Maybe if you lost a little weight we could win this race!" while a word bubble appears from the horse's mouth that spells out these words.

Further, the microphones 519 allow the gaming machine to record in a memory device the audio signals corresponding to the input acoustic signals from the player. Later in the gaming session, the gaming machine can then broadcast from its speakers selected words or sentences from the player, such an emphatic "Yes!" in the player's voice (or a processed form of the player's voice) after a certain winning outcome is achieved.

Further, the present invention contemplates the use of the microphones 519 in conjunction with a microphone activation key (e.g., a talk button) associated with the gaming machine. As such, the player would activate this key prior to providing his or her acoustic input. Similarly, the gaming machine may be provided with activation key for enabling any gesture sensing instruments on the machine to sense gesture inputs. The player would activate this key prior to providing his or her gesture input.

While the present invention has been described with reference to one or more particular embodiments, those skilled in the art will recognize that many changes may be made thereto without departing from the spirit and scope of the present invention. For example, the instrument 90, 190, or 290 in FIGS. 5-7 could be replaced by a sensing glove worn by the player. Each of these embodiments and obvious variations thereof is contemplated as falling within the spirit and scope of the claimed invention, which is set forth in the following claims.

What is claimed is:

1. A wagering gaming machine, comprising:

a processor for randomly selecting one of a plurality of outcomes of said gaming machine in response to a wager amount;

a touch panel display coupled to said processor and providing player inputs, said touch panel display distinguishing between a first gesture based on the change in position of at least one of two simultaneous continuous contacts on said touch panel display indicative of a first player input from a player and a second gesture based on the change in position of at least one of two simultaneous continuous contacts on said touch panel display indicative of a second player input from said player; and a memory for storing a first plurality of position data signals and associated temporal data signals, each of the first plurality of position data signals indicative of a different physical position and associated temporal point of the player in making said first gesture, said first plurality position data signals indicative of the movement of said first gesture and a second plurality of position data signals and associated temporal data signals, each of the second plurality of position data signals indicative of a different physical position and associated temporal point of the player in making said second gesture, said second plurality of position data signals indicative of the movement of said second gesture, wherein said processor is programmed with instructions to compare at least said first plurality of position data signals with one of a plurality of predetermined gesture inputs to determine a first function associated with at least said first gesture, the plurality of predetermined gesture inputs each having a plurality of position data indicating the different physical positions and associated temporal points of a player associated with said predetermined gesture input; and displaying on the touch panel display feedback indicative of said game function and said movement, said feedback including a path of touch panel display elements between said change in position of said at least one of two simultaneous continuous contacts.

2. The gaming machine of claim 1, wherein said gaming machine further comprises lights that are activated in sequence in response to said at least one of two simultaneous continuous contacts.

3. The gaming machine of claim 1, wherein said touch-panel display is operational in a bonus-game mode of said gaming machine.

4. The gaming machine of claim 1, wherein at least one of said first and second gestures is a physical action that relates to a theme of said gaming machine.

5. The gaming machine of claim 1, wherein at least one of said first and second player inputs is related to said wager.

6. The gaming machine of claim 1, wherein said touch-panel display includes a controller for operating said touch-panel display, said controller being in communication with said processor.

7. The gaming machine of claim 1, wherein said gaming machine is a card game, at least one of said first and second player inputs being related to receiving or declining an additional card.

8. The gaming machine of claim 1, further including at least one microphone for monitoring an acoustic input from a player, said processor performing a certain function in response to receipt of a certain acoustic input.

9. The gaming machine of claim 1, further including an activation button for activating said touch-panel display.

10. A method of operating a wagering gaming machine including a touch panel display, comprising:

sensing, via the touch panel display, movement based on the change in position of at least one of two simultaneous continuous contacts on said touch panel display by a player;

comparing signals indicative of said movement with predetermined data signals to determine a player input;

associating a game function with said player input;

displaying on the touch panel display feedback indicative of said game function and said movement, said feedback including a stream of lights on said touch panel display physically corresponding with said change in position of said at least one of two simultaneous continuous contacts;

performing said function in said gaming machine; and randomly selecting one of a plurality of outcomes of said wagering gaming machine.

11. The method of claim 10, further comprising displaying on a display of said gaming machine an animation indicative of a movement resulting from the at least two simultaneous contacts.

12. The method of claim 10, further comprising sensing, via said touch panel, a gesture including one of said at least two simultaneous contacts, said gesture including maintaining contact with the touch panel.

13. The method of claim 10, further comprising sensing, via said touch panel, at least two gestures, which each include one of said at least two simultaneous contacts, respectively, said at least two gestures maintaining contact with the touch panel.

14. The method of claim 13, wherein said function relates to a poker game, said at least two gestures corresponding to movement of the player's hands in a direction away from each other, indicating declination of an additional card of said poker game.

* * * * *

UNITED STATES PATENT AND TRADEMARK OFFICE

CERTIFICATE OF CORRECTION

PATENT NO. : 7,618,323 B2
APPLICATION NO. : 10/376216
DATED : November 17, 2009
INVENTOR(S) : Rothschild et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Nineteenth Day of October, 2010

David J. Kappos
*Director of the United States Patent and Trademark Office*